UNITED STATES PATENT OFFICE 2,586,128

PREPARATION OF PHTHALIC ANHYDRIDE FROM 3.4.0. BICYCLIC NONYL HYDROCARBON

Francis T. Wadsworth, Dickinson, Tex., assignor to Pan American Refining Corporation, Texas City, Tex., a corporation of Delaware No Drawing. Application June 20, 1950, Serial No. 169,285

6 Claims. (Cl. 260—342)

This invention relates to the preparation of phthalic anhydride by catalytic vapor phase oxidation of cyclic non-aromatic hydrocarbons. The invention has more particular reference to the preparation of phthalic anhydride by the combined dehydrogenation and oxidation of bicyclic hydrocarbons having nine carbon atoms per molecule and refers also to improvements in preparation of feed stocks whereby improved ultimate yields of phthalic anhydride can be obtained.

The controlled partial oxidation of naphthalene in vapor phase in the presence of air over a vanadium pentoxide catalyst to produce phthalic anhydride is a well known process. Other aromatic compounds, for example, orthoxylene, have also been successfully employed as a feed stock.

Aromatic hydrocarbons are in considerable demand because of their many uses, and their supply is, of course, not unlimited. Non-aromatic cyclic hydrocarbons are often found in petroleum fractions, and are produced, sometimes in considerable quantity, by modern refinery techniques. The separation of the cyclic nonyl compounds from this abundant stock and their conversion to phthalic anhydride will provide a sizable supply of this chemical, and a supply that is unexpected because method and means have not heretofore been known whereby phthalic anhydride could be produced by oxidation of non-aromatic compounds.

The primary object of this invention is the provision of a process of preparing phthalic anhydride from bicyclic non-aromatic nonyl hydrocarbons. Another object of the invention is the provision of improvements in a process of oxidizing an alicyclic organic feed stock to phthalic anhydride whereby isomerization of the feed stock is accomplished and a greatly enhanced yield of the phthalic anhydride is obtained. The invention has for other objects such other advantages or results as will appear in the specification or the claims hereinafter made.

The foregoing objects of invention are accomplished by an oxidation process which can be briefly described as a vapor phase oxidation of an organic hydrocarbon stock containing a bicyclic nonyl hydrocarbon having one six- and one five-membered ring, preferably bicyclononadiene, at temperatures between about 290° and 420° C. and in the presence of at least 30 and preferably about 60 liters of air per gram of hydrocarbon and a solid oxidation catalyst. Further improvements are provided by a thermal pretreatment, at autogenous pressures, and a claying of organic hydrocarbon stock.

The operable temperature range is considerably higher than the oxidation temperatures customarily employed in making phthalic anhydride from an aromatic compound (see, for example, "The Chemistry of Organic Compounds" by Conant and Blatt, page 508, wherein an operating temperature of 250° C. is reported and it is stated that complete combustion will take place if conditions are not carefully controlled). It is most unexpected that the considerably less stable cyclic hydrocarbon should require higher oxidation temperatures than naphthalene and that the hydrocarbon at these elevated temperatures can withstand complete combustion.

The preferred bicyclononadiene can be any one or an admixture of three isomers of 3.4.0. bicyclononadiene wherein the two double bonds of the compound can be, in one case at the 1 and 5 positions, in another at the 1 and 6 position, and in a third between a tertiary carbon atom and the 1 position and at the 5 position as hereinafter illustrated:

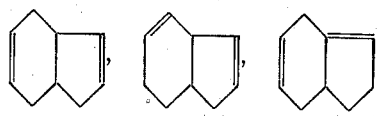

The isomers oxidize at varying rates to provide phthalic anhydride in varying yields.

It has been found that when a vaporous mixture of isomers is heated for several hours, preferably from about 5 to 20 hours, at temperatures of about 200° to 300° C., an apparent isomerization of the mixture is accomplished whereby the subsequent aromatization and oxidation of the so-treated cyclic compound can result in improved yield. An additional improvement in yield and product quality is observed when the bicyclononadiene is pretreated with a clay, for example, an Attapulgus clay (for detailed description of this clay, see Ind. Eng. Chem. 42, 3, pp. 529–533, March 1950). When these expedients are employed in combination, there has been recovered as high as substantially theoretical yields of phthalic anhydride.

One source, for example, of the said bicyclononadiene isomers is a distillate fraction of the pyrolytic polymerization of low molecular weight olefins, particularly ethylene. The polymer is treated to provide an effective drying oil according to the process described and claimed in assignee's copending application Smith, Ser. No. 718,859, filed December 27, 1946, now U. S. Patent No. 2,535,606, issued Dec. 26, 1950. In the preparation of this product, the bottoms are steam stripped and the distillate resulting from the stripping provides a source of the mixed isomers of bicyclononadiene.

It is preferred also to fractionate the isomeric mixture to within a relatively narrow distillation range in order to provide high yields of the phthalic anhydride. While fractions boiling between about 150° and 175° C. provide practicable yields of phthalic anhydride, substantially theoretical yields are obtained from fractions boiling between the preferred range of about 158° to 164° C. This preferred fraction exhibits the molecular weight of bicyclononadiene and phthalic anhydride obtained from this material has a melting point of 130° C. as compared to the reported value of 130.8° C. No depression of the melting point was observed on mixing this material with a pure sample.

It is observed that different degress of hydrogenation may obtain with respect to the alicyclic nonyl hydrocarbon feed. For example, the bicyclononadiene in the above described distillate fraction may not be entirely free of even the completely saturated hexahydroindane. Bicyclononene and hexahydroindane also provide a useful source for the preparation of phthalic anhydride.

Although the stoichiometric requirement of oxygen for the partial oxidation of the bicyclononadiene is the same as that required for naphthalene, sizable excesses of air and preferably about 60 liters of air per gram of the vaporized cyclic hydrocarbon (over 200 mols of air per mol of hydrocarbon) are required to produce high yields of high quality product.

As hereinbefore noted, the oxidation of the bicyclononadiene feed is accomplished in vapor phase and attempts to oxidize the bicyclononadiene mixture in liquid phase were unsuccessful.

It is furthermore preferred to carry out the vapor phase oxidation over a vanadium pentoxide catalyst supported on pumice. However, other known oxidation catalysts are suitable also for this oxidation; for example, molybdenum oxide or mixtures of it and vanadium oxide. Vanadium pentoxide catalyst supported on silica gel has also been used and is usually satisfactory although at times it effects a high tar production. Other useful supports which may be used are pelleted infusorial earth and aluminum turnings.

The following examples will serve to clarify and illustrate the present invention.

*Example I*

A mixture of organic compounds containing predominantly bicyclononadiene and obtained as a distillate fraction produced in the steam stripping of the bottoms product of the pyrolytic polymerization of ethylene was oxidized to phthalic anhydride by passing air and the said distillate in vapor phase over vanadium pentoxide supported on pumice. A reaction temperature of 350° to 360° C. was maintained. An air to hydrocarbon ratio of 30 liters of air per gram of hydrocarbon was maintained, thus providing a contact time of the reactants with the catalyst of about 0.4 second. A 40% yield of phthalic anhydride was obtained.

*Example II*

Another portion of the distillate fraction described in Example I was distilled and fractionated into several fractions, each constituting 5% by volume of the total distillate. The fraction boiling between 158° and 164° C. was vaporized with air which had been preheated to a temperature of 110° C. The air and hydrocarbon vapor mixture in the ratio of about 40 liters of air per gram of hydrocarbon was passed through a reaction zone containing 80 milliliters of a vanadium pentoxide catalyst supported on pumice. The temperature of the catalyst bed was maintained at about 320° C. A yield of 48% of phthalic anhydride by weight based on the employed hydrocarbon fraction was obtained.

*Example III*

A distillate product was obtained by steam stripping the bottoms product obtained in the polymerization of ethylene by pyrolysis. This bottoms product was steam stripped to a desired viscosity so as to yield a drying oil as a distillation residue. The recovered distillate had an A. P. I. gravity of 20.5 and distilled within a temperature range of 118° to 293° C. This product was fractionated and the fraction boiling between 158° and 164° C. was vaporized with air in the ratio of 70 liters of air per gram of hydrocarbon and was flowed over a catalyst bed maintained at a temperature between 340° and 350° C. The catalyst was vanadium pentoxide supported on pumice. The air before admixture with vaporized hydrocarbon was preheated to a temperature of between 170° and 180° C. A yield of 64.8% of phthalic anhydride by weight based on the employed hydrocarbon was obtained.

*Example IV*

Hexahydroindane was prepared by hydrogenating bicyclononadiene over platinum under a hydrogen pressure of 40 pounds per square inch at room temperature. The hexahydroindane was vaporized and admixed with preheated air in the varying ratio of 70 to 150 liters of air per gram of the hexahydroindane. The product was flowed over a vanadium pentoxide supported on pumice in a reaction zone maintained at varying temperatures of 290° to 420° C. As only a 20 mol per cent yield of phthalic anhydride was obtained from this product it is clear that the unsaturated bicyclononadiene is a preferred feed stock.

*Example V*

A fraction was obtained as a distillate from the polymerization of ethylene and the distillation and polymerization of the bottoms product. This in turn was fractionated and a fraction boiling within the narrow range of 162 to 164° C. and consisting substantially entirely of 3,4,0-bicyclononadiene was obtained. The distillate fraction was vaporized and was mixed with air in the ratio of 60 liters of air per gram of hydrocarbon and was flowed into contact with vanadium pentoxide supported on pumice in a concentration of 10 weight per cent based on the pumice, in a reaction zone maintained at a temperature between 310° and 320° C. The yield when using this select charging stock was 70 weight per cent by weight of the charged hydrocarbon. In another instance a somewhat wider fraction of distillate boiling between 158° and 164° C. was used. A yield of 65% by weight was obtained.

*Example VI*

The bottoms fraction from the distillation of the polymerized product of the pyrolysis of ethylene was heated at 260° C. for a period of 16 hours. The product was then fractionated on a 30 plate Oldershaw column into fractions each consisting of 5% by volume of the total charge. These individual fractions were then oxidized to phthalic anhydride by a vapor phase oxidation over vanadium pentoxide supported on pumice. Yet another fraction of the bottoms product was treated at the same temperature and for the same period in a stirring bomb in the presence of one weight per cent of Attapulgus clay which also favorably influenced the yield.

*Example VII*

The distillate that is separated from the bottoms product of the pyrolytic polymerization of ethylene was heated at a temperature of 260° to 275° C. for a period of 8 hours whereupon the so-treated product was redistilled. Another portion of the said bottoms product distillate was heated at 260° C. for 4 hours with one weight per cent of Attapulgus clay and was subsequently redistilled. The thermal treatments were carried out in a stirring autoclave at the vapor pressure of the hydrocarbon which autogenous pressure in this case was between 100 to 125 pounds per square inch gauge. The products of the thermal treatment were fractionated into relatively close boiling fractions. Each fraction was oxidized in vapor phase by passing the vaporized hydrocarbon in admixture with air in a ratio of 70 liters of air per gram of hydrocarbon and the mixture was passed through a reaction zone over vanadium pentoxide supported on silica gel in a concentration of 10% by weight based on the silica gel. It was found that the preheating or thermal treatment step alone effected slight improvement in the yield of phthalic anhydride, and that the combination of the preheating step and clay treatment is particularly effective and provides an average yield of over 80%.

In summary of the above specific examples, it was demonstrated that high and economical yields of phthalic anhydride can be obtained in the vapor phase oxidation of bicyclic nonyl hydrocarbons by vaporizing the said hydrocarbons and passing them over a vanadium pentoxide catalyst at the elevated temperatures of between about 290° to 420° C. in a ratio of air to vaporized hydrocarbon of between about 30 and 150 liters of air per gram of hydrocarbon and over a supported vanadium pentoxide cataylst preferably in a concentration of about 10% by weight of the employed support. One example, in which the above described procedure and a modern method of separating the product powder from the air stream were employed, provided a substantially 100% yield of the phthalic anhydride.

I claim:

1. A process of preparing phthalic anhydride from a non-aromatic 3.4.0. bicyclic nonyl hydrocarbon, the said process comprising vaporizing a said nonyl hydrocarbon, admixing air with the vapors in a ratio of from 30 to 150 liters of air per gram of hydrocarbon, flowing the admixture into contact with a solid oxidation catalyst at a temperature between about 290° and 420° C., whereby the said hydrocarbon is aromatized and dehydrogenated, and recovering phthalic anhydride from the product stream.

2. The process of claim 1 in which the non-aromatic 3.4.0. bicyclic nonyl hydrocarbon is a bicyclononadiene.

3. A process of synthesizing phthalic anhydride comprising heating a 3.4.0. bicyclononadiene to a temperature between about 200° and 350° C. for a period of about 60 to 240 minutes, vaporizing the so-heated bicyclononadiene, admixing air with the vapors in a ratio of about 60 to 120 liters of air per gram of bicyclononadiene and flowing the same over a supported vanadium oxide catalyst at a temperature between about 290° and 420° C. and thereby aromatizing and dehydrogenating the bicyclononadiene to form phthalic anhydride.

4. The process of claim 3 in which the non-aromatic bicyclic nonyl hydrocarbon is 3.4.0. bicyclononadiene and the catalyst support is pumice.

5. The synthesis of phthalic anhydride from a 3.4.0. cyclic nonyl hydrocarbon comprising the steps of heating the nonyl hydrocarbon and maintaining it at autogenous pressures and a temperature between 240° and 350° C. for a period of about 60 to 240 minutes while treating the same with an adsorbent clay, distilling the heat and clay-treated product from the clay and absorbed impurities, admixing air with vaporized heat and clay treated product in a ratio of 60 to 120 liters of air per gram of nonyl hydrocarbon, flowing the mixture into contact with a vanadium pentoxide catalyst that is supported on pumice at a temperature between about 290° and 420° C. whereby an aromatization and dehydrogenation of the cyclic nonyl hydrocarbon is effected, and recovering phthalic anhydride from an effluent mixture of air and product.

6. The process of claim 5 in which the 3.4.0. nonyl hydrocarbon is a bicyclononadiene.

FRANCIS T. WADSWORTH.

REFERENCES CITED

The following references are of record in the file of this patent:

UNITED STATES PATENTS

| Number    | Name   | Date         |
|-----------|--------|--------------|
| 2,142,678 | Porter | Jan. 3, 1939 |

FOREIGN PATENTS

| Number  | Country       | Date          |
|---------|---------------|---------------|
| 145,071 | Great Britain | Mar. 31, 1921 |